(12) United States Patent
Funaki et al.

(10) Patent No.: US 7,528,184 B2
(45) Date of Patent: May 5, 2009

(54) PERFLUOROELASTOMER COMPOSITION AND PERFLUORO RUBBER MOLDED ARTICLE

(75) Inventors: Hiroshi Funaki, Ichihara (JP); Makoto Honda, Ichihara (JP); Masayuki Saito, Ichihara (JP); Hiroki Kamiya, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 86 days.

(21) Appl. No.: 11/505,801

(22) Filed: Aug. 18, 2006

(65) Prior Publication Data

US 2007/0072973 A1     Mar. 29, 2007

(30) Foreign Application Priority Data

Sep. 26, 2005   (JP)   ............................ 2005-278961
Mar. 27, 2006   (JP)   ............................ 2006-086541

(51) Int. Cl.
*C04B 28/04* (2006.01)
*C08L 27/12* (2006.01)
*C08L 27/00* (2006.01)
*D06M 15/277* (2006.01)
*C08K 5/07* (2006.01)

(52) U.S. Cl. ........................... 524/7; 524/301; 524/323; 524/357; 524/394; 524/544; 524/545; 524/551; 524/440

(58) Field of Classification Search ................. 524/544, 524/545, 551, 7
See application file for complete search history.

(56) References Cited

U.S. PATENT DOCUMENTS

| 6,921,796 B2 * | 7/2005 | Hetherington ............ 525/326.3 |
| 2002/0099142 A1 * | 7/2002 | Faulkner ..................... 525/199 |
| 2005/0155690 A1 * | 7/2005 | Park ........................... 156/60 |

FOREIGN PATENT DOCUMENTS

| JP | 5-271478 | | 10/1993 |
| JP | 09302043 A | * | 11/1997 |
| JP | 10-101879 | | 4/1998 |
| JP | 2888972 | | 2/1999 |
| JP | 3508136 | | 1/2004 |
| WO | WO 90/14367 | | 11/1990 |

OTHER PUBLICATIONS

Translation of JP 09302043A.*

* cited by examiner

*Primary Examiner*—Marc S Zimmer
*Assistant Examiner*—Nicole M Buie
(74) *Attorney, Agent, or Firm*—Oblon, Spivak, McClelland, Maier & Neustadt, P.C.

(57) ABSTRACT

A perfluoroelastomer composition comprises a perfluoroelastomer (e.g., tetrafluoroethylene/perfluoro(methyl vinyl ether) copolymer), an organic peroxide (e.g., 2,5-dimethyl-2, 5-di(tert-butylperoxy)hexane and a scorch retarder (e.g., o-phenylphenol), and the perfluoroelastomer composition is excellent in processability and unlikely to scorch. Furthermore, a perfluoro rubber molded article obtained by thermal crosslinking of the perfluoroelastomer composition is excellent in rubber physical properties such as tensile strength and elongation at break and in a compression set property.

12 Claims, No Drawings

PERFLUOROELASTOMER COMPOSITION AND PERFLUORO RUBBER MOLDED ARTICLE

TECHNICAL FIELD

The present invention relates to a perfluoro rubber molded article excellent in a compression set property and a perfluoroelastomer composition used for its production.

BACKGROUND ART

A vinylidene fluoride/hexafluoropropylene copolymer, a tetrafluoroethylene/propylene copolymer, a tetrafluoroethylene/perfluoro(alkyl vinyl ether) copolymer, etc. are known as fluoro rubbers.

Among them, the tetrafluoroethylene/perfluoro(alkyl vinyl ether) copolymer is called a perfluoroelastomer, which is remarkably excellent in heat resistance and chemical resistance, and also in plasma resistance.

A known crosslinking method for a perfluoroelastomer is a method in which a perfluoroelastomer containing an iodine atom, a bromine atom or the like is crosslinked with a peroxide (e.g. Japanese Patent No. 3508136, for example). Among them, a perfluoroelastomer containing iodine is widely used because a crosslinking time is short and no metal oxide needs to be added for crosslinking.

A method for producing an iodine-containing perfluoroelastomer is a method of copolymerizing perfluoro monomers in the presence of a diiodo compound represented by the general formula $RI_2$ (wherein R is a saturated fluorohydrocarbon group or chlorofluorohydrocarbon group having a carbon number of from 1 to 16, or a hydrocarbon group having a carbon number of from 1 to 3), to produce a perfluoroelastomer with an iodine atom at a polymer terminal (e.g. Japanese Patent No. 3508136, for example). However, when the iodine content in the perfluoroelastomer produced by the above method is adjusted to achieve a necessary crosslinking density as a rubber, the iodine content is so large that the crosslinking proceeds rapidly, to cause scorching. On the other hand, if the iodine content was decreased to an amount low enough to avoid scorching, there was a problem that the crosslinking density was too low to provide satisfactory rubber properties.

Furthermore, a rubber molded article obtained by crosslinking of the perfluoroelastomer produced by the above method had a disadvantage such as low tensile strength, as compared with molded articles of other fluoro rubbers such as the vinylidene fluoride/hexafluoropropylene copolymer and tetrafluoroethylene/propylene copolymer. Particularly, in a case where the perfluoroelastomer is used as a sealing material for semiconductor manufacturing equipment, there is a demand for minimizing a content of a blending material in molding of a rubber. For example, carbon black, which is widely and generally used as a reinforcing material for rubber, becomes a source of dust from the sealing material and then there was a demand for decrease in the blending amount thereof. However, the decrease in the blending amount of the reinforcing material of carbon black tends to raise a problem that the tensile strength of the perfluoroelastomer molded article is considerably decreased.

Therefore, there was a following method reported: an iodine content in a polymer terminal was lowered and a crosslinking density was controlled by copolymerizing iodine—or bromine-containing monomers as represented by $CF_2=CF-R^{f1}-X$ (wherein $R^{f1}$ is a saturated polyfluoroalkylene group or polyfluorooxyalkylene group and X is I or Br) (e.g. Japanese Patent No. 3508136 and Japanese Patent No. 2888972, for example).

When the crosslinking density was increased by this method, other important properties such as the elongation at break and compression set property were sometimes deteriorated.

There was no known perfluoroelastomer composition capable of facilitating a kneading operation and providing a perfluoro rubber molded article having a sufficiently high tensile strength, and an excellent elongation at break and compression set property.

It is known to add one of quinones and phenols as a scorch retarder in order to control a crosslinking reaction rate in a crosslinking step of elastomer, in cases of hydrocarbon rubbers, and fluorine-containing rubbers except for perfluoro rubbers (e.g. JP-A-5-271478 and JP-A-10-101879, for example).

However, it is not known to add a scorch retarder in the peroxide crosslinking of the perfluoroelastomer, and it is totally unknown to achieve an effect of improvement in physical properties of the resulting molded article, in addition to the prevention of scorching.

Under these circumstances, there are strong desires for a perfluoroelastomer composition good in processability, unlikely to scorch, and capable of providing a perfluoro rubber molded article through crosslinking with excellent rubber properties, such as the tensile strength and elongation at break, and with an excellent compression set property.

DISCLOSURE OF THE INVENTION

Object to be Accomplished by the Invention

An object of the present invention is to provide a perfluoroelastomer composition good in processability, unlikely to scorch, and capable of providing a perfluoro rubber molded article with excellent rubber properties and compression set property. Furthermore, an object of the present invention is to provide a perfluoroelastomer composition capable of providing a perfluoro rubber molded article with excellent tensile strength, elongation at break and compression set property, and a perfluoro rubber molded article obtained by crosslinking of the composition. In the description of the present invention, a composition obtained by compounding of various additives such as a crosslinking agent in a perfluoroelastomer is called a perfluoroelastomer composition. Furthermore, a molded article obtained by crosslinking of the composition is called a perfluoro rubber molded article.

Means to Accomplish the Object

The present invention provides a perfluoroelastomer composition comprising (a) a perfluoroelastomer, (b) an organic peroxide and (c) a scorch retarder.

The present invention further provides a perfluoroelastomer composition which is the above-mentioned perfluoroelastomer composition wherein a content of the component (b) is from 0.05 to 10 parts by mass, and a content of the component (c) is from 0.01 to 5 parts by mass, relative to 100 parts by mass of the component (a).

The present invention further provides a perfluoroelastomer composition which is the above-mentioned perfluoroelastomer composition wherein the perfluoroelastomer of component (a) is a copolymer having a repeating unit based on tetrafluoroethylene and a repeating unit based on $CF_2=CF-O-R^f$ (wherein $R^f$ is a $C_{1-20}$ perfluoroalkyl group which may have an etheric oxygen atom).

The present invention further provides a perfluoroelastomer composition which is the above-mentioned perfluoroelastomer composition wherein the perfluoroelastomer of component (a) contains an iodine atom and/or a bromine atom.

The present invention further provides a perfluoroelastomer composition which is the above-mentioned perfluoroelastomer composition wherein the perfluoroelastomer of component (a) has a Mooney viscosity (Mooney viscosity measured in accordance with JIS K6300 using a large rotor with a diameter of 38.1 mm and a thickness of 5.54 mm at 100° C. for a preheat time of one minute and for a rotor rotation time of four minutes) of from 50 to 100.

The present invention further provides a perfluoroelastomer composition which is the above-mentioned perfluoroelastomer composition wherein the organic peroxide of component (b) has a one-minute half-life temperature of from 150 to 250° C.

The present invention further provides a perfluoroelastomer composition which is the above-mentioned perfluoroelastomer composition wherein the scorch retarder of component (c) is at least one member selected from the group consisting of phenolic hydroxyl group-containing compounds, quinones and α-methylstyrene dimers.

The present invention further provides a perfluoroelastomer composition which is the above-mentioned perfluoroelastomer composition wherein the perfluoroelastomer of component (a) is a copolymer having a repeating unit based on tetrafluoroethylene and a repeating unit based on perfluoro (methyl vinyl ether).

The present invention further provides a perfluoroelastomer composition which is the above-mentioned perfluoroelastomer composition wherein the perfluoroelastomer of component (a) is a copolymer having a repeating unit based on tetrafluoroethylene and a repeating unit based on perfluoro (methyl vinyl ether), the organic peroxide of component (b) is 2,5-dimethyl-2,5-di(tert-butylperoxy)hexane, and the scorch retarder of component (c) is at least one member selected from the group consisting of o-phenylphenol, hydroquinone and 2,4-diphenyl-4-methyl-1-pentene.

The present invention further provides a perfluoroelastomer composition which is the above-mentioned perfluoroelastomer composition which further contains (d) sodium stearate.

The present invention further provides a perfluoroelastomer composition which is the above-mentioned perfluoroelastomer composition wherein a content of the component (d) is from 0.1 to 10 parts by mass, relative to 100 parts by mass of the component (a).

The present invention further provides a perfluoro rubber molded article obtained by thermal crosslinking of the above-mentioned perfluoroelastomer composition.

The present invention further provides a perfluoro rubber molded article obtained by thermal crosslinking of a perfluoroelastomer composition comprising essential components of (a) a perfluoroelastomer with a Mooney viscosity of at least 30 and (b) an organic peroxide, and (c) a scorch retarder and/or (d) sodium stearate if necessary, wherein a tensile strength measured in accordance with JIS K6251 is at least 25 MPa.

Effect of the Present Invention

The perfluoroelastomer composition according to the present invention is excellent in the crosslinking property, good in processability and unlikely to scorch. Furthermore, the perfluoro rubber molded article according to the present invention is excellent in the plasma resistance, heat resistance and chemical resistance, and particularly excellent in the compression set property. In addition, a certain perfluoro rubber molded article according to the present invention is excellent in the tensile strength, elongation at break and compression set property.

Best Mode for Carrying out the Invention

The perfluoroelastomer used for the perfluoroelastomer composition according to the present invention can be preferably a copolymer having a repeating unit based on tetrafluoroethylene (hereinafter referred to as "TFE") and a repeating unit based on $CF_2=CF—O—R^f$ (wherein $R^f$ is a $C_{1-20}$ perfluoroalkyl group which may have an etheric oxygen atom). $CF_2=CF—O—R^f$ may be used alone or in combination as a mixture of two or more of them. Preferable examples thereof include $CF_2=CF—O—CF_3$, $CF_2=CF—O—CF_2CF_3$, $CF_2=CF—O—CF_2CF_2CF_3$, $CF_2=CF—O—CF_2CF(CF_3)OCF_2CF_2CF_3$, $CF_2=CF—O—CF_2CF_2—O—CF_2CF_3$, and so on, among which $CF_2=CF—O—CF_3$ is more preferred. Furthermore, the carbon number of $R^f$ is preferably in a range of from 1 to 20 and more preferably in a range of from 1 to 8.

The copolymerization ratio in the copolymer is preferably the repeating unit based on TFE/the repeating unit based on $CF_2=CF—O—R^f=30-80/70-20$ (molar ratio). When the ratio is within this range, excellent rubber physical properties are obtained.

The perfluoroelastomer is preferably one substantially containing no hydrogen atom, but it is also possible to use a perfluoroelastomer obtained with use of a chain transfer agent and a comonomer containing a small amount of hydrogen. Specific examples of the chain transfer agent containing hydrogen include chain or cyclic saturated hydrocarbons such as methane, ethane, propane, butane, pentane, hexane and cyclohexane, alcohols such as methanol, ethanol and propanol, and mercaptans such as tert-dodecylmercaptan, n-dodecylmercaptan and n-octadecylmercaptan. The chain transfer agent may be used alone or in combination as a mixture of two or more of them.

Furthermore, examples of the comonomer containing a hydrogen atom include $CF_2=CF—O—CH_2CF_3$, $CF_2=CF—O—CH_2CF_2CF_2CF_3$, $CF_2=CF—O—CH_2(CF_2CF_2)_2H$, $CF_2=CF—O—CF_2CF_2CH_2—I$, $CF_2=CF—O—CF_2CF_2CH_2—Br$, $CF_2=CF—O—CF_2CF_2(CF_3)—O—CF_2CF_2CH_2—I$, $CF_2=CF—O—CF_2CF_2(CF_3)—O—CF_2CF_2CH_2—Br$ and so on. The comonomer containing a hydrogen atom may be used alone or in combination as a mixture of two or more of them. However, since increase in the content of hydrogen results in deteriorating the performance of the perfluoro rubber such as the heat resistance and chemical resistance, the content of hydrogen in the perfluoroelastomer in the present invention is preferably at most 0.5 mass %, more preferably at most 0.3 mass %, and particularly preferably at most 0.1 mass %.

In addition, the perfluoroelastomer used in the present invention is preferably a perfluoroelastomer containing iodine and/or bromine, more preferably a perfluoroelastomer containing iodine. Examples of the perfluoroelastomer containing iodine and/or bromine are described in JP-A-53-125491, JP-B-53-4115 and JP-A-59-20310. It is possible to use an iodine- and/or bromine-containing perfluoroelastomer that is obtained by polymerizing an iodine- and/or bromine-containing monomer, in addition to at least one perfluoro monomer selected from the group consisting of TFE and $CF_2=CF—O—R^f$, or by copolymerizing the above-mentioned monomers in the presence of a compound represented by $I—R^{f2}—I$ (wherein $R^{f2}$ is a $C_{1-8}$ perfluoroalkylene group which may have an etheric oxygen atom).

Specific examples of the above-mentioned iodine- and/or bromine-containing monomer include $CF_2=CFBr$, $CH_2=CHCF_2CF_2Br$, $CF_2=CF-O-CF_2CF_2-I$, $CF_2=CF-O-CF_2CF_2-Br$, $CF_2=CF-O-CF_2CF_2CH_2-I$, $CF_2=CF-O-CF_2CF_2CH_2-Br$, $CF_2=CF-O-CF_2CF_2(CF_3)-O-CF_2CF_2CH_2-I$, $CF_2=CF-O-CF_2CF_2(CF_3)-O-CF_2CF_2CH_2-Br$ and so on.

Furthermore, specific examples of the above-mentioned I—R$^{f2}$—I include diiodoperfluoromethane, 1,2-diiodoperfluoroethane, 1,3-diiodoperfluoropropane, 1,4-diiodoperfluorobutane, 1-5-diiodoperfluoropentane, 1,6-diiodoperfluorohexane, 1,7-diiodoperfluoroheptane, 1,8-diiodoperfluorooctane, and so on, among which 1,4-diiodoperfluorobutane and 1,6-diiodoperfluorohexane are preferred and 1,4-diiodoperfluorobutane is particularly preferred.

The iodine and/or bromine in the perfluoroelastomer is preferably bonded to a polymer terminal.

There are no particular restrictions on the iodine content in the perfluoroelastomer used in the present invention, but it is preferably in a range of from 0.1 to 1.5 mass %, more preferably in a range of from 0.2 to 1.0 mass %, and particularly preferably in a range of from 0.25 to 1.0 mass %. When the content is within this range, it is possible to obtain a composition which can provide a crosslinked rubber excellent in the rubber physical properties and compression set.

Furthermore, the perfluoroelastomer used in the present invention has the Mooney viscosity at 100° C. in accordance with JIS K6300 in the following range: it is preferably from 1 to 100, more preferably from 5 to 50, yet more preferably from 5 to 30, and particularly preferably at least 5 and below 20 for good blending operation. Furthermore, in order to achieve excellent tensile strength, elongation at break and compression set property, the Mooney viscosity is preferably at least 30, more preferably from 40 to 100 and particularly preferably from 50 to 100. The Mooney viscosity is an indication for various average molecular weights: a larger value indicates a higher molecular weight and a smaller value indicates a lower molecular weight. If the Mooney viscosity is too high, the blending operation tends to be difficult. Within the foregoing range, blending is easy and the rubber properties after crosslinking are good.

The perfluoroelastomer used in the present invention has the glass transition temperature (hereinafter referred to as "Tg") of preferably from −50 to 25° C., more preferably from −50 to 0° C. and most preferably from −50 to −3° C.

There are no particular restrictions on the organic peroxide (b) as the crosslinking agent used in the present invention, and the organic peroxide preferably has a one-minute half-life temperature, which is a temperature at which a half amount of the organic peroxide is decomposed within one minute, of from 150 to 250° C. and more preferably from 150 to 200° C. Specific examples of the organic peroxide include dialkyl peroxides such as di-tert-butyl peroxide, tert-butyl cumyl peroxide, dicumyl peroxide, α,α-bis(tert-butylperoxy)-p-diisopropylbenzene, 2,5-dimethyl-2,5-di(tert-butylperoxy) hexane and 2,5-dimethyl-2,5-di(tert-butylperoxy)hexane-3, 1,1-di(tert-butylperoxy)-3,3-5-trimethylcyclohexane, 2,5-dimethylhexane-2,5-dihydroxy peroxide, benzoyl peroxide, tert-butylperoxybenzene, 2,5-dimethyl-2,5-di(benzoylperoxy)hexane, tert-butylperoxy maleic acid, tert-butylperoxy isopropyl carbonate, and so on. The organic peroxide (b) may be used alone or in combination as a mixture of two or more of them.

The content of the organic peroxide (b) is preferably from 0.05 to 10 parts by mass, more preferably from 0.3 to 5 parts by mass, and most preferably from 0.5 to 3 parts by mass, relative to 100 parts by mass of the perfluoroelastomer. When the content is within this range, it is possible to obtain a composition which can provide a crosslinked rubber excellent in the rubber physical properties and compression set.

Specific examples of the scorch retarder (c) include phenolic hydroxyl group-containing compounds such as bisphenol A, bisphenol AF, phenol, cresol, p-phenylphenol, m-phenylphenol, o-phenylphenol, allylphenol, p-hydroxy benzoic acid and ethyl p-hydroxy benzoate, quinones such as hydroquinone, hydroquinone monoethyl ether and hydroquinone monomethyl ether, α-methylstyrene dimers such as 2,4-di(3-isopropylphenyl)-4-methyl-1-pentene, 2,4-di(4-isopropylphenyl)-4-methyl-1-pentene, 2-(3-isopropylphenyl)-4-(4-isopropylphenyl)-4-methyl-1-pentene, 2-(4-isopropylphenyl)-4-(3-isopropylphenyl)-4-methyl-1-pentene, 2,4-di(3-methylphenyl)-4-methyl-1-pentene, 2,4-di(4-methylphenyl)-4-methyl-1-pentene and 2,4-diphenyl-4-methyl-1-pentene, and so on.

The scorch retarder (c) is preferably at least one member selected from the group consisting of the phenolic hydroxyl group-containing compounds, quinones and α-methylstyrene dimers. The scorch retarder (c) is more preferably at least one member selected from the group consisting of o-phenylphenol, hydroquinone and 2,4-diphenyl-4-methyl-1-pentene.

The scorch retarder (c) is further preferably o-phenylphenol or 2,4-diphenyl-4-methyl-1-pentene, particularly preferably o-phenylphenol. The scorch retarder may be used alone or in combination as a mixture of two or more of them.

The content of the scorch retarder (c) is preferably from 0.05 to 3 parts by mass, more preferably from 0.05 to 1 part by mass, relative to 100 parts by mass of the perfluoroelastomer.

When the perfluoroelastomer composition of the present invention is crosslinked, a crosslinking aid is preferably contained. When the crosslinking aid is contained, crosslinking efficiency becomes high. Specific examples of the crosslinking aid include triallyl cyanurate, triallyl isocyanurate, trimethallyl isocyanurate, 1,3,5-triacryloyl hexahydro-1,3,5-triazine, triallyl trimellitate, m-phenylene diamine bis maleimide, p-quinone dioxime, p,p'-dibenzoyl quinone dioxime, dipropargyl terephthalate, diallyl phthalate, N,N', N",N"'-tetraallyl terephthalamide, a vinyl group-containing siloxane oligomer such as polymethylvinyl siloxane and polymethylphenylvinyl siloxane, and so on. Particularly, the crosslinking aid is preferably triallyl cyanurate, triallyl isocyanurate or trimethallyl isocyanurate, and more preferably triallyl isocyanurate. The content of the crosslinking aid is preferably from 0.1 to 10 parts by mass, more preferably from 0.5 to 5 parts by mass, relative to 100 parts by mass of the perfluoroelastomer. When the content is within this range, it is possible to obtain the crosslinking property with well-balanced strength and elongation.

By incorporating (d) sodium stearate, the perfluoroelastomer composition of the present invention can be made to retain excellent properties such as tensile strength and elongation at break and to have the compression set reduced significantly. The content of (d) sodium stearate is preferably from 0.1 to 10 parts by mass, more preferably from 0.1 to 5 parts by mass, and most preferably from 0.1 to 3 parts by mass, relative to 100 parts by mass of the perfluoroelastomer.

Furthermore, when the perfluoroelastomer composition of the present invention is crosslinked, a metal oxide can be contained if the case demands. Particularly, in a case where the perfluoroelastomer is a bromine-containing perfluoroelastomer, the crosslinking reaction can be carried out quickly and securely by incorporating the metal oxide. Specifically, the metal oxide is preferably an oxide of a bivalent metal such as magnesium oxide, calcium oxide, zinc oxide or lead oxide. The content of the metal oxide is preferably from 0.1 to 10 parts by mass, more preferably from 0.5 to 5 parts by mass, relative to 100 parts by mass of the perfluoroelastomer. When the content is within this range, it is possible to obtain a crosslinked rubber molded article excellent in the rubber physical properties and compression set property.

In addition, when the perfluoroelastomer composition of the present invention is crosslinked, a pigment for coloring, a filler, a reinforcing agent or the like may be contained. The pigment, filler or reinforcing agent commonly used is carbon black, titanium oxide, silicon dioxide, clay, talc, polytetrafluoroethylene, polyvinylidene fluoride, polyvinyl fluoride, polychlorotrifluoroethylene, a tetrafluoroethylene/ethylene copolymer, a tetrafluoroethylene/propylene copolymer, a tetrafluoroethylene/vinylidene fluoride copolymer or the like. The content of the pigment is preferably from 0.1 to 50 parts by mass relative to 100 parts by mass of the perfluoroelastomer. The content of the filler is preferably from 1 to 100 parts by mass relative to 100 parts by mass of the perfluoroelastomer. The content of the reinforcing agent is preferably from 1 to 100 parts by mass relative to 100 parts by mass of the perfluoroelastomer.

The perfluoroelastomer composition of the present invention can be obtained by mixing the above-mentioned components. Various mixing methods are available for the mixing, and they may be compounded by means of twin rolls, a kneader, a banbury mixer or the like. If heat is generated intensively during the compounding, it is preferable to cool the kneader such as rolls. The compounding temperature is preferably at most 60° C., more preferably at most 50° C. Furthermore, there are no particular restrictions on the lower limit of the compounding temperature and it is normally at least 20° C.

A perfluoro rubber molded article according to the present invention is obtained by crosslinking and molding a perfluoroelastomer composition comprising (a) a perfluoroelastomer, (b) an organic peroxide and (c) a scorch retarder as essential components.

Furthermore, another perfluoro rubber molded article according to the present invention is obtained by thermal crosslinking of a perfluoroelastomer composition comprising essential components of (a) a perfluoroelastomer with a Mooney viscosity of at least 30 and (b) an organic peroxide, and (c) a scorch retarder if necessary, whereby the tensile strength measured in accordance with JIS K6251 can be made to be at least 25 MPa, preferably at least 27 MPa. In this case, it is also preferable to use (c) the scorch retarder as an essential component.

The molding can be carried out simultaneously with the crosslinking or carried out before the crosslinking. There are no particular restrictions on the molding method, and there are various molding methods, such as pressure molding, compression molding, extrusion, and injection molding.

The crosslinking reaction is preferably carried out at a temperature of from 150 to 300° C. When the crosslinking is effected in this temperature range, the resulting perfluoro rubber molded article is excellent in the rubber physical properties and compression set property. The crosslinking reaction is normally effected by combination of a primary crosslinking reaction at a relatively low temperature with a secondary crosslinking reaction at a relatively high temperature.

The primary crosslinking reaction temperature is normally preferably from 150 to 200° C. The secondary crosslinking reaction temperature is normally preferably from 200 to 300° C., more preferably from 220 to 290° C. and particularly preferably from 230 to 280° C. The crosslinking time may be optionally determined. A specific preferable example of the combination of primary and secondary crosslinking reactions is as follows: the primary crosslinking reaction is carried out by hot press at 150 to 200° C. for 3 to 60 minutes and the secondary crosslinking reaction is carried out in an oven at 200 to 300° C. for 1 to 24 hours.

EXAMPLES

Now, the present invention will be explained in further detail with reference to examples. However, the present invention is by no means restricted to such specific examples. The Mooney viscosity and physical properties were measured by the methods below.

[Mooney Viscosity] It is a viscosity as measured in accordance with JIS K6300 using a large rotor with a diameter of 38.1 mm and a thickness of 5.54 mm, at 100° C. for a preheat time of one minute and for a rotor rotation time of four minutes. It is indirectly indicated that the larger the value, the higher the molecular weight.

[Measurement of Physical Properties] A crosslinked rubber sheet with a thickness of 2 mm was punched out in a No. 3 dumbbell form to make a sample, and the tensile strength and elongation at break thereof were measured in accordance with JIS K6251. Further, hardness was measured in accordance with JIS K6253.

[Compression Set] It was measured in accordance with JIS K6301.

[Evaluation of Scorch Property] A value of $t_{90}$ (a time required to reach 90% of the maximum torque shown during a crosslinking test) was measured in execution of the crosslinking test at an angle of 3° at 177° C. for 12 minutes by means of a rubber process analyzer RPA2000 manufactured by ALPHA TECHNOLOGIES, thereby evaluating a scorch property. If $t_{90}$ was less than one minute, occurrence of scorch was assumed. If $t_{90}$ was at least one minute, no occurrence of scorch was assumed. The smaller the $t_{90}$, the shorter the time from setting of a rubber composition in a die of a press machine to a start of crosslinking becomes, thereby deteriorating processability in processing.

Example 1

100 parts by mass of a perfluoroelastomer (Mooney viscosity of 19.9, Tg=−5.0° C., iodine content=0.52 mass %), obtained by emulsion polymerization to copolymerize TFE and perfluoro(methyl vinyl ether) (hereinafter referred to as "PMVE") in the presence of 1,4-diiodo-perfluorobutane, and having the repeating unit based on TFE/the repeating unit based on PMVE=65/35 (molar ratio), 20 parts by mass of carbon black as a reinforcing agent, 3 parts by mass of triallyl isocyanurate (hereinafter referred to as "TAIC") as a crosslinking aid, 1 part by mass of 2,5-dimethyl-2,5-di(tert-butylperoxy)hexane (trade name of "PERHEXA25B" manufactured by NOF CORPORATION) as an organic peroxide and 0.3 part by mass of o-phenylphenol as a scorch retarder were compounded by means of twin rolls to obtain a total amount of 124.3 parts by mass of a perfluoroelastomer composition. The composition was evaluated for the scorch property. Furthermore, this perfluoroelastomer composition was subjected to primary crosslinking by hot press at 170° C. for 20 minutes and further to secondary crosslinking at 250° C. for 4 hours to obtain a crosslinked rubber sheet with a thickness of 2 mm. This rubber sheet was measured for the physical properties and compression set. The results are shown in Table 1.

Example 2

The perfluoroelastomer composition obtained in Example 1 was subjected to primary crosslinking by hot press at 170° C. for 20 minutes and to secondary crosslinking at 200° C. for 4 hours to obtain a crosslinked rubber sheet with a thickness of 2 mm. This rubber sheet was measured for the physical properties and compression set. The results are shown in Table 1.

Example 3

A perfluoroelastomer composition was obtained in the same manner as in Example 1 except that 0.5 part by mass of hydroquinone was used as the scorch retarder. The composition was evaluated for the scorch property. Furthermore, a crosslinked rubber sheet with a thickness of 2 mm was obtained from the composition in the same manner as in Example 1. This rubber sheet was measured for the physical properties and compression set. The results are shown in Table 1.

Example 4

A perfluoroelastomer composition was obtained in the same manner as in Example 1 except that 0.15 part by mass of 2,4-diphenyl-4-methyl-1-pentene (trade name: NOFMER MSD" manufactured by NOF CORPORATION) was used as the scorch retarder. The composition was evaluated for the scorch property. Furthermore, a crosslinked rubber sheet with a thickness of 2 mm was obtained from the composition in the same manner as in Example 1. This rubber sheet was measured for the physical properties and compression set. The results are shown in Table 1.

Example 5

100 parts by mass of a perfluoroelastomer (Mooney viscosity of 59.3, Tg=−5.0° C., iodine content=0.36 mass %), obtained by emulsion polymerization to copolymerize TFE and perfluoro(methyl vinyl ether) (hereinafter referred to as "PMVE") in the presence of 1,4-diiodo-perfluorobutane, and having the repeating unit based on TFE/the repeating unit based on PMVE=65/35 (molar ratio), 20 parts by mass of carbon black as a reinforcing agent, 3 parts by mass of triallyl isocyanurate (hereinafter referred to as "TAIC") as a crosslinking aid, 1 part by mass of 2,5-dimethyl-2,5di(tert-butylperoxy)hexane (trade name of "PERHEXA25B" manufactured by NOF CORPORATION) as an organic peroxide and 0.2 part by mass of o-phenylphenol as a scorch retarder were compounded by means of twin rolls to obtain a total amount of 124.2 parts by mass of a perfluoroelastomer composition. This perfluoroelastomer composition was subjected to primary crosslinking by hot press at 170° C. for 20 minutes and further to secondary crosslinking at 250° C. for 4 hours to obtain a crosslinked rubber sheet with a thickness of 2 mm. This rubber sheet was measured for the physical properties and compression set. The results are shown in Table 1. The crosslinked perfluoro rubbers obtained in Examples 1 to 5 were excellent in plasma resistance, chemical resistance and heat resistance.

Example 6

100 parts by mass of a perfluoroelastomer (Mooney viscosity of 19.9, Tg=−5.0° C., iodine content=0.52 mass %), obtained by emulsion polymerization to copolymerize TFE and PMVE in the presence of 1,4-diiodo-perfluorobutane, and having the repeating unit based on TFE/the repeating unit based on PMVE=65/35 (molar ratio), 20 parts by mass of carbon black as a reinforcing agent, 3 parts by mass of triallyl isocyanurate (hereinafter referred to as "TAIC") as a crosslinking aid, 1 part by mass of 2,5-dimethyl-2,5-di(tert-butylperoxy)hexane (trade name of "PERHEXA25B" manufactured by NOF CORPORATION) as an organic peroxide, 0.3 part by mass of o-phenylphenol as a scorch retarder and 1 part by mass of sodium stearate were compounded by means of twin rolls to obtain a total amount of 125.3 parts by mass of a perfluoroelastomer composition. The composition was evaluated for the scorch property. Furthermore, this perfluoroelastomer composition was subjected to primary crosslinking by hot press at 170° C. for 20 minutes and further to secondary crosslinking at 250° C. for 4 hours to obtain a crosslinked rubber sheet with a thickness of 2 mm. This rubber sheet was measured for the physical properties and compression set. The results are shown in Table 1.

Comparative Example 1

A perfluoroelastomer composition was obtained in the same manner as in Example 1 except that no scorch retarder was used. This composition was evaluated for the scorch property. Furthermore, a crosslinked rubber sheet with a thickness of 2 mm was obtained from the composition in the same manner as in Example 1. This rubber sheet was measured for the physical properties and compression set. The results are shown in Table 1.

TABLE 1

|  |  |  | Example 1 | Example 2 | Example 3 | Example 4 | Example 5 | Example 6 | Comparative Example 1 |
|---|---|---|---|---|---|---|---|---|---|
| Recipe of composition part by mass | Perfluoro-elastomer | Mooney viscosity | 19.9 | 19.9 | 19.9 | 19.9 | 59.3 | 19.9 | 19.9 |
|  |  | Iodine content (mass %) | 0.52 | 0.52 | 0.52 | 0.52 | 0.36 | 0.52 | 0.52 |
|  |  | Blending amount | 100 | 100 | 100 | 100 | 100 | 100 | 100 |
|  | Carbon black |  | 20 | 20 | 20 | 20 | 20 | 20 | 20 |
|  | TAIC |  | 3 | 3 | 3 | 3 | 3 | 3 | 3 |
|  | PERHEXA 25B |  | 1 | 1 | 1 | 1 | 1 | 1 | 1 |
|  | o-Phenylphenol |  | 0.3 | 0.3 | — | — | 0.2 | 0.3 | — |
|  | Hydroquinone |  | — | — | 0.5 | — | — | — | — |

TABLE 1-continued

|  | | Example 1 | Example 2 | Example 3 | Example 4 | Example 5 | Example 6 | Comparative Example 1 |
|---|---|---|---|---|---|---|---|---|
| | 2,4-Diphenyl-4-methyl-1-pentene | — | — | — | 0.15 | — | — | — |
| | Sodium stearate | — | — | — | — | — | 1 | — |
| Primary crosslinking temperature (° C.) | | 170 | 170 | 170 | 170 | 170 | 170 | 170 |
| Secondary crosslinking temperature (° C.) | | 250 | 200 | 250 | 250 | 250 | 250 | 250 |
| $t_{90}$ (minute) | | 1.66 | 1.66 | 1.64 | 1.78 | 1.20 | 1.23 | 0.60 |
| Occurrence of scorch | | Absent | Absent | Absent | Absent | Absent | Absent | Present |
| Tensile strength (MPa) | | 20.8 | 19.8 | 19.7 | 20.5 | 29.1 | 17.9 | 18.5 |
| Elongation at break (%) | | 188 | 210 | 190 | 200 | 254 | 232 | 288 |
| Hardness (Shore A) | | 86 | 85 | 86 | 85 | 86 | 84 | 84 |
| Compression set (%) | | 14.1 | 26.8 | 19.8 | 23.1 | 16.7 | 7.8 | 45.6 |

INDUSTRIAL APPLICABILITY

The perfluoroelastomer composition and perfluoro rubber molded article of the present invention are used for O-rings, sheets, gaskets, oilseals, diaphragms and V-rings. Furthermore, they are applicable to sealing materials for semiconductor manufacturing equipment, chemical-resistant sealing materials, paints, covering materials for electric wires and so on.

The entire disclosures of Japanese Patent Application No. 2005-278961, filed on Sep. 26, 2005, Japanese Patent Application No. 2006-086541, filed on Mar. 27, 2006, and Japanese Patent Application No. 2006-169401 filed on Jun. 19, 2006 including specifications, claims and summaries are incorporated herein by reference in their entireties.

What is claimed is:

1. A perfluoroelastomer composition comprising (a) a perfluoroelastomer, (b) an organic peroxide, (c) a scorch retarder, and (d) sodium stearate.

2. The perfluoroelastomer composition according to claim 1, wherein a content of the component (b) is from 0.05 to 10 parts by mass, and a content of the component (c) is from 0.01 to 5 parts by mass, relative to 100 parts by mass of the component (a).

3. The perfluoroelastomer composition according to claim 1, wherein the perfluoroelastomer of component (a) is a copolymer having a repeating unit based on tetrafluoroethylene and a repeating unit based on $CF_2=CF-O-R^f$ (wherein $R^f$ is a $C_{1-20}$ perfluoroalkyl group which may have an etheric oxygen atom).

4. The perfluoroelastomer composition according to claim 1, wherein the perfluoroelastomer of component (a) contains an iodine atom and/or a bromine atom.

5. The perfluoroelastomer composition according to claim 1, wherein the perfluoroelastomer of component (a) has a Mooney viscosity of from 50 to 100 as measured in accordance with JIS K6300 using a large rotor with a diameter of 38.1 mm and a thickness of 5.54 mm at 100° C. for a preheat time of one minute and for a rotor rotation time of four minutes.

6. The perfluoroelastomer composition according to claim 1, wherein the organic peroxide of component (b) has a one-minute half-life temperature of from 150 to 250° C.

7. The perfluoroelastomer composition according to claim 1, wherein the scorch retarder of component (c) is at least one member selected from the group consisting of phenolic hydroxyl group-containing compounds, quinones and α-methylstyrene dimers.

8. The perfluoroelastomer composition according to claim 1, wherein the perfluoroelastomer of component (a) is a copolymer having a repeating unit based on tetrafluoroethylene and a repeating unit based on perfluoro(methyl vinyl ether).

9. The perfluoroelastomer composition according to claim 1, wherein the perfluoroelastomer of component (a) is a copolymer having a repeating unit based on tetrafluoroethylene and a repeating unit based on perfluoro(methyl vinyl ether), the organic peroxide of component (b) is 2,5-dimethyl-2,5(tert-butylperoxy)hexane, and the scorch retarder of component (c) is at least one member selected from the group consisting of o-phenylphenol, hydroquinone and 2,4-diphenyl-4-methyl-1-pentene.

10. The perfluoroelastomer composition according to claim 1, wherein a content of the component (d) is from 0.1 to 10 parts by mass, relative to 100 parts by mass of the component (a).

11. A perfluoro rubber molded article obtained by thermal crosslinking of the perfluoroelastomer composition as defined in claim 1.

12. A perfluoro rubber molded article obtained by thermal crosslinking of a perfluoroelastomer composition comprising essential components of (a) a perfluoroelastomer with a Mooney viscosity of at least 30 and (b) an organic peroxide, and (c) a scorch retarder and (d) sodium stearate, wherein a tensile strength measured in accordance with JIS K6251 is at least 25 MPa.

* * * * *